US006305061B1

(12) United States Patent
King

(10) Patent No.: US 6,305,061 B1
(45) Date of Patent: Oct. 23, 2001

(54) COMBINATION STEERING WHEEL PULLER AND LOCKING DISC REMOVAL AND INSTALLATION TOOL FOR VEHICLES

(76) Inventor: Roger N. King, 610 Little Mountain Rd., Anderson, SC (US) 29626

( * ) Notice: Subject to any disclaimer, the term of this patent is extended or adjusted under 35 U.S.C. 154(b) by 0 days.

(21) Appl. No.: 09/499,383

(22) Filed: Feb. 7, 2000

Related U.S. Application Data

(60) Provisional application No. 60/120,762, filed on Feb. 19, 1999.

(51) Int. Cl.[7] ....................................................... B23P 19/04
(52) U.S. Cl. .................................................................. 29/259
(58) Field of Search ........................................ 29/256–266

(56) References Cited

U.S. PATENT DOCUMENTS

| | | | |
|---|---|---|---|
| 1,394,129 | 10/1921 | Wickersham . | |
| 1,708,355 | 4/1929 | Chipman . | |
| 3,060,559 | 10/1962 | Levenson . | |
| 3,298,681 * | 1/1967 | Youngblood | 269/69 |
| 4,021,903 | 5/1977 | Walsh . | |
| 4,868,965 | 9/1989 | Drymon . | |
| 4,908,925 | 3/1990 | Johnson . | |
| 4,989,312 | 2/1991 | Maddalena . | |
| 5,692,282 * | 12/1997 | Baca | 29/235 |

FOREIGN PATENT DOCUMENTS 1 404 002 8/1975 (GB) .

* cited by examiner

*Primary Examiner*—Robert C. Watson
(74) *Attorney, Agent, or Firm*—Richard C. Litman

(57) ABSTRACT

A combination tool provides for removing a steering wheel from its press fit on a steering wheel shaft in a vehicle, or for compressing the locking disc disposed beneath the steering wheel hub for removal of its retaining ring and of the disc after the steering wheel has been removed. The tool is also useful in reinstalling the locking disc for reassembly after maintenance. The present tool includes a plate having a central threaded passage larger than the diameter of the threaded steering wheel shaft with which the tool is to be used. Two opposed, radially disposed steering wheel puller slots are provided, one to either side of the central passage, and two opposed threaded locking disc compression bolt holes are also provided through the plate. The device may be used for removal of the steering wheel from its press fit on the steering wheel shaft (after removal of overlying components, such as the air bag, horn actuation assembly, etc.) and for removal of the locking disc disposed beneath the steering wheel hub, after removal of the steering wheel. The combination tool is easily converted from one function to the other, as a total of only five bolts are required with the plate to provide both of the above functions. The bolts provided with the present disc, and the threaded passages through the disc, are preferably standard sizes and thread pitches, in order to provide easy and economical purchase and replacement of such fasteners when required.

1 Claim, 5 Drawing Sheets

COMBINATION STEERING WHEEL PULLER AND LOCKING DISC REMOVAL AND INSTALLATION TOOL FOR VEHICLES

CROSS-REFERENCE TO RELATED APPLICATION

This application claims the benefit of U.S. Provisional Patent Application Serial No. 60/120,762, filed Feb. 19, 1999.

BACKGROUND OF THE INVENTION

1. Field of the Invention

The present invention relates generally to hand tools and the like, and more specifically to a tool for assisting in the removal and installation of the steering wheel and locking components thereof in a motor vehicle. The device may be used for pulling or pressing the steering wheel from the steering wheel shaft after access is gained to the conventional nut and threaded shaft end holding the wheel to the steering column shaft. The present tool is also useful for removing and installing the locking plate behind the steering wheel, which prevents rotation of the steering wheel and shaft when the ignition key is removed from the combination ignition and steering wheel lock. The present combination tool is easily convertible between the two functions.

2. Description of the Related Art

Newer automobiles have become increasingly complex, as consumers request more and more safety and comfort features. These features add value to the vehicles, but also make such vehicles more desirable targets for thieves. Accordingly, for some time automobiles have been required by Federal statute, to include various means for making theft more difficult.

One of the anti-theft systems which has been required in automobiles for many years, is a means of automatically locking the steering column or shaft so the steering wheel (and front wheels) cannot be turned when the ignition key is removed from the ignition switch. Accordingly, automobile manufacturers have conventionally installed the ignition switch in the steering column, where it actuates a mechanism which engages a steering shaft locking disc to preclude rotation thereof (and of the steering wheel) when the key is removed from the ignition switch.

While the above anti-theft systems have served well to prevent casual theft of automobiles, it will be seen that they also make it much more difficult to perform maintenance and repair work on such vehicles, particularly removal and replacement of worn or damaged ignition switch mechanisms, as well as other components which may only be accessed by removing the steering wheel and anti-theft components. Heretofore, a mechanic generally required at least two different tools for such work. First, a pulling tool was used for removing the steering wheel, then a separate tool was needed for compressing the locking disc for removal of its retaining snap ring.

Accordingly, a need arises for a single tool which can perform both functions required, i.e., removing the steering wheel and also compressing the locking disc against its spring for removing the snap ring used to retain the locking disc in place. The tool may also be used to install the locking disc, by compressing the disc against its backing spring so the snap ring may be reinstalled. The present invention provides a single tool which performs all of the above functions, with minimal adjustment needed to reconfigure the tool from one function to another. A discussion of the related art of which the present inventor is aware, and its differences and distinctions from the present invention, is provided below.

U.S. Pat. No. 1,394,129 issued on Oct. 18, 1921 to Alfred R. Wickersham, titled "Gear Puller," describes what is now generally considered to be a conventional tool, comprising a slotted plate with a central compression bolt and a plurality of hooks or fingers which may be adjustably installed within the slots of the plate as required. Each of the hooks includes a hooked end which is hooked through some open structure of the gear, flywheel, or other component being pulled, and the central bolt is tightened against the central shaft of the gear through a threaded passage in the disc to provide a tensile force on the disc and fingers to pull the gear from its force fit on the shaft. The fingers cannot be threaded into passages in the gear or other device, as provided by the present tool, and moreover, Wickersham does not provide any means for converting his tool for use in applying pressure to an underlying component, as provided by the present tool.

U.S. Pat. No. 1,708,355 issued on Apr. 9, 1929 to Eddie G. Chipman, titled "Gear Puller," describes a device for pulling gears having external helical or hypoid type tooth configurations. The central plate is cruciform with a series of threaded passages therethrough. A central bolt is used to provide a compressive force against the central shaft upon which the gear is seated, with a series of fingers being installed through the threaded passages and hooked to the teeth of the gear. Each of the fingers has a series of grooves angularly formed therein conforming to the angle and pitch of the teeth of the gear, with a flange across the distal end to capture the edge of the teeth therein. As in the case of the Wickersham puller, the Chipman puller cannot be used to provide a compressive force against a disc or the like secured to a shaft, as provided by the present combination tool. Moreover, the Chipman device is particularly adapted for use with gears having helical teeth configurations, and cannot be used for pulling a device which does not have such a tooth configuration, such as a steering wheel.

U.S. Pat. No. 3,060,559 issued on Oct. 30, 1962 to Sol J. Levinson, titled "Bearing Remover Having Axle Holding Retention Member," describes a two part tool having a base which fits behind the end plate of a drive axle, and a bearing lifting component which fits between the end plate and outer axle bearing, behind the bearing. The base is secured to the end plate, with bolts threaded through cooperating holes in the lifting component to bear against the underlying base component to force the lifting component away from the base component and lift the bearing from its fit on the end of the axle. Due to the fit of the components about the sides of the bearing and axle assembly, the device cannot be adapted for engaging a steering wheel hub and/or locking disc assembly housed within the surrounding shell of a steering column, as can the present tool. Also, the Levinson tool cannot be converted to apply a compressive force to the end plate underlying the bearing after the bearing is removed, whereas the present tool may be used to apply a compressive force to the locking disc of a steering column after the overlying steering wheel has been removed.

U.S. Pat. No. 4,021,903 issued on May 10, 1977 to Richard Walsh, titled "Method And Tool For Removing Lock Cylinder Assemblies," describes a collet-type device which acts only upon the lock cylinder itself, to withdraw the lock cylinder from its housing in the steering column. The Walsh tool does not provide any means of removing the steering wheel from its press fit on the steering shaft, nor for compressing the locking disc for removal of its retaining snap ring, both of which functions are provided by the present invention.

U.S. Pat. No. 4,868,965 issued on Sep. 26, 1989 to Larry L. Drymon, titled "Compact Universal Steering Wheel Pulling System," describes a puller comprising a block with a threaded central hole and two pairs of slots disposed at different radial distances from the central hole. The Drymon puller is used conventionally, by threading a compression bolt through the central hole and passing pair of bolts through two opposed slots to engage mating threaded passages in the steering wheel hub. The central bolt is then tightened to exert a compressive force on the end of the steering shaft, with the opposed radially positioned bolts threaded into the steering wheel hub thus providing a reactive tensile force to pull the steering wheel hub from the shaft. The present tool may be used in a similar manner. However, Drymon fails to provide any radially displaced threaded passages through his puller block, whereas the present tool includes such passages. These threaded passages in the present tool allow it to be used as a locking disc compression tool when the present central block or disc is secured to the steering shaft after pulling the steering wheel, by exerting a compressive force on the underlying locking disc so the retaining snap ring may be removed. The Drymon tool cannot be used in this manner.

U.S. Pat. No. 4,908,925 issued on Mar. 20, 1990 to Rudolph E. Johnson, titled "Heavy Duty Automotive Wheel Hub Puller," describes a device comprising a bar having a central threaded passage for a compression bolt. Outwardly disposed tension bolts include lugs or ears thereon for bolting to the existing lugs of the wheel. The central bolt is then turned to compress against the axle center, thus pulling the tension bolts and attached wheel from its hub. The Johnson device thus more closely resembles the Wickersham and Chipman gear pullers discussed further above, than the present steering wheel puller with its radially displaced bolts which engage mating threaded passages in the steering wheel hub. Also, the Johnson device cannot be used to compress a disc about the hub, as can the present combination tool.

U.S. Pat. No. 4,989,312 issued on Feb. 5, 1991 to Kris L. Maddalena, titled "Universal Wheel Puller And Lock Plate Compressor Tool," describes a tool performing the same functions as the present tool, but which has a considerably different structure and configuration and operates in a different manner than the present tool. The Maddalena tool comprises a central bar (rather than the plate of the present tool). The bar includes a central threaded passage through which a large diameter rod is threaded, and laterally opposed slots to each side for accepting tension bolts. The tool is used conventionally to pull a steering wheel from its shaft, when assembled as described above. However, the Maddalena tool also has an unthreaded hole and opposed threaded passages through the bar, normal to the threaded central hole and opposed slots. The lateral bolts are threaded through the opposed holes and apply compression to the locking disc after removing the steering wheel. However, the Maddalena tool is secured to the steering shaft to provide the required compressive force, in a different manner than that used by the present tool for compressing the locking disc. The threaded rod of the Maddalena tool has a threaded socket at one end, which is secured to the steering shaft after removing the steering wheel. The unthreaded hole of the bar is then passed over the threaded rod, and a nut is threaded onto the rod above the bar. As the nut is tightened downwardly against the bar, the bar is forced toward the locking disc, compressing the two lateral bolts against the disc to compress the disc for removal of the snap ring. The Maddalena tool thus requires a different socket configuration for the central bolt, for each different thread configuration of various steering shaft ends with which the Maddalena tool is to be used. In contrast, the present tool requires only a single central bolt, with the diameter and pitch of the central bolt being unimportant so long as it matches the diameter and pitch of the central passage of the plate of the present tool, with that passage having a larger diameter than the threaded steering shaft end. Thus, the central plate may be passed over the threaded steering shaft end, and the original steering wheel nut, removed before removing the steering wheel, is threaded back onto the end of the shaft to compress the plate toward the locking disc. The Maddalena device is considerably more complex, requiring the central bolt to be unthreaded from the threaded hole, reinserted into the unthreaded hole 90 degrees to the first hole, and a cooperating nut (with one required for each different bolt configuration) threaded onto the bolt, to compress the bar.

Finally, British Patent Publication No. 1,404,002 published on Aug. 28, 1975 to Alan G. Purvis, titled "Puller Tool," describes a tool for pulling wheel hubs from their mating axles, in the manner of the tool of the Johnson '925 U.S. patent discussed further above. Various embodiments of the Purvis tool are disclosed, for use in pulling wheels having various numbers of lugs. Thus, the Purvis tool is more closely related to the device of the Johnson '925 U.S. patent, than to the present invention.

None of the above inventions and patents, either singly or in combination, is seen to describe the instant invention as claimed.

SUMMARY OF THE INVENTION

The present invention comprises a combination tool for use in pulling a steering wheel from a press fit on the steering column of a vehicle, and which may be easily converted for use in compressing the locking disc within the steering column once the steering wheel has been removed therefrom. The present tool basically comprises a plate having a threaded central passage therethrough, with a pair of laterally opposed slots to either side thereof. A pair of threaded passages of smaller diameter than the central passage, is also provided through the plate and offset from the two slots.

A conventional bolt and a pair of hand actuated bolts each sized for mating respectively with the central threaded passage and two smaller threaded passages, are also provided. Finally, a pair of relatively smaller threaded tension bolts for passage through the two slots is provided, with the two smaller threaded bolts sized for attachment to the conventional threaded holes provided in a steering wheel hub for pulling the steering wheel.

The present tool is used to pull a steering wheel (after removal of overlying components) by passing the two smaller tension bolts through the slots, with the radial extension of the slots providing adjustment for the diameter of the bolt circle of the puller holes in the steering wheel hub. The two tension bolts are then threaded into the corresponding puller holes. The central bolt is then threaded through the central passage of the plate and tightened, pulling the plate away from the wheel and pulling the wheel from the shaft by means of the tension bolts.

The present tool is easily reconfigured for use in compressing the locking disc disposed beneath the wheel hub, once the wheel has been removed. The three bolts are removed from the plate (after removal of the two smaller bolts from the steering wheel hub), and the two hand actuated bolts (eye bolts, winged head bolts, etc.) are threaded through the two outlying holes of the plate. The central passage of the plate is passed over the bare steering wheel shaft, and the conventional nut which was used to secure the steering wheel in place, is rethreaded to the end of the shaft ever the plate. As the nut is tightened, the ends of the two bolts bear against the underlying locking disc, compressing it against its underlying spring so the retaining snap ring may be removed. The plate is then removed from the steering shaft by removing the steering wheel nut, with the locking disc being pushed out by its compression spring for access to underlying components.

Accordingly, it is a principal object of the invention to provide an improved combination tool for removing steering wheels from their respective shafts and further for removing and replacing locking discs in locking steering columns in vehicles.

It is another object of the invention to provide an improved tool comprising a plate with a threaded central passage for passing over the threaded end of the steering shaft of a vehicle and for accepting a mating conventional bolt therein, with the plate including two opposed, radially disposed slots for accepting steering hub puller bolts therethrough and two opposed threaded passages for accepting locking plate compression bolts therein.

It is a further object of the invention to provide an improved combination tool utilizing conventional threaded fasteners for use with the plate as a steering wheel puller and/or as a locking disc compression tool, for easy and inexpensive replacement as required.

It is an object of the invention to provide improved elements and arrangements thereof in an apparatus for the purposes described which is inexpensive, dependable and fully effective in accomplishing its intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
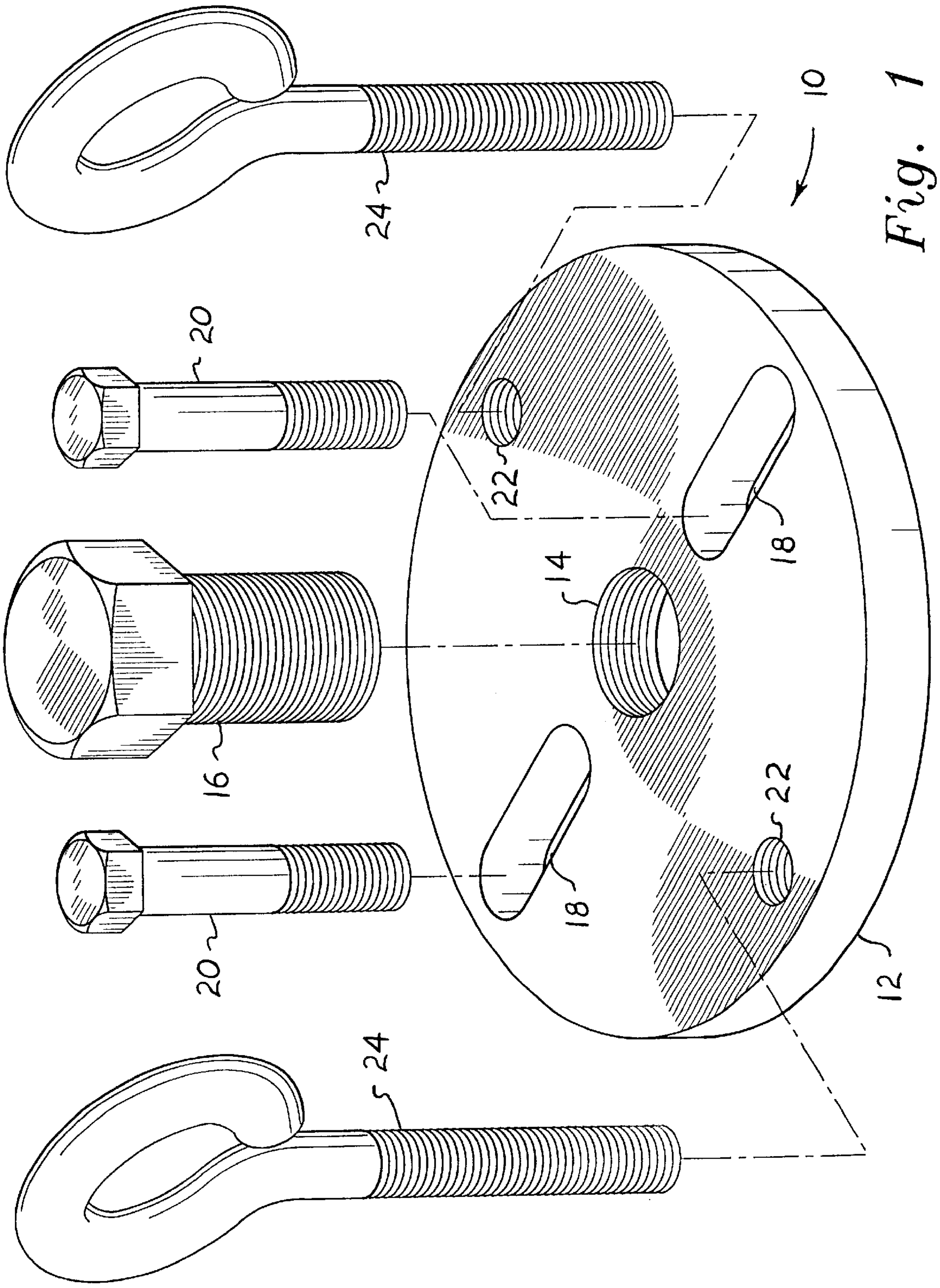
FIG. 1 is an exploded perspective view of the present combination tool, showing all of its components.

The present invention comprises a combination tool for removing the steering wheel of a vehicle from its press fit on the steering shaft, and also for removing and reinstalling a locking disc which is normally disposed beneath the steering wheel hub when the steering wheel is installed. FIG. 1 provides a view of the various components of the present combination tool, designated by the reference numeral 10. The primary component of the tool 10 is a flat, rigid metal plate 12 having a series of passages or holes formed therethrough, through which various bolts or fasteners are selectively installed for performing the above noted functions. The plate 12 is preferably formed of a hard, durable material, such as steel plate, having a thickness selected to preclude any significant bending when bending forces are applied across the plate due to alternate tensile and compressive loads. The plate 12 may be circular, as shown throughout the drawings, or may alternatively be formed to have some other peripheral shape, as desired.

The plate 12 includes a threaded central passage 14 formed therethrough, for accepting a mating threaded central steering shaft compression bolt 16 therein, functioning as described further below. The specific diameters of the central bolt hole or passage 14 of the plate 12 and the mating bolt 16 are not critical, so long as the hole 14 is sufficiently large as to provide non-engaging clearance over the threaded and unthreaded diameters of the end of any steering wheel shaft with which the present tool 10 may be used.

The plate 12 also includes a plurality (preferably two, although this may be varied if so required for non-standard steering wheel hub configurations) of radially disposed steering wheel hub tension bolt slots 18 formed therethrough. These slots 18 are oriented to align generally with the conventional hub pulling holes generally provided in conventional steering wheel hubs, for engaging pulling bolts for pulling the hub from the shaft. The slots 18 are preferably directly opposite one another. The radially elongate configuration of the slots 18 provide adjustment in the positioning of the hub pulling bolts installed therein, for different bolt circle diameters of hub pulling holes provided in different steering wheel hubs. The width of the slots 18 is not critical, so long as the slots 18 are sufficiently wide as to provide clearance for any conventional hub pulling bolts which may be installed therein, with the size of the bolts depending upon the corresponding holes in the steering wheel hub.

A plurality of hub pulling tension bolts 20 corresponding to the number of slots 18, are removably installed through the slots 18 for using the present tool 10 for pulling a steering wheel from its press fit on a steering wheel shaft, as described further below. The tension bolts 20 are the only threaded fastener components of the present invention which are critical in terms of diameter and thread pitch, as they must be of a configuration for threading into the corresponding hub pulling holes conventionally provided in a steering wheel hub. These holes have different diameters and thread pitches, depending upon the manufacturer.

The plate 12 also includes a plurality (again, preferably two, although more could be provided) of threaded locking disc compression bolt holes 22 formed therethrough, for accepting mating locking disc compression bolts when the tool 10 is used for compressing the conventional locking disc in a steering column after removal of the steering wheel therefrom. The compression bolt holes 22 are preferably directly opposed to one another, and also preferably evenly spaced between the previously discussed hub pulling tension bolt slots 18. With two such slots 18 and two compression bolt holes 22, the slots 18 and holes 22 alternate with one another about the face of the plate 12, and are preferably arcuately separated by 90 degrees from one another. Again, other arrangements may be provided as desired.

A plurality of locking disc compression bolts 24 corresponding to the plurality of locking disc compression bolt holes 22 is also provided, with the compression bolts 24 having the same diameter and thread pitch as the holes 22 for threadedly mating therewith. The compression bolts 24 serve to bear against the locking plate disposed within the steering column for removal thereof, after removing the steering wheel. The compression bolts 24 may be hand actuated, as opposed to requiring a wrench or other tool for turning. Eye bolts, such as the bolts 24 shown in the drawings, may be provided, or alternatively some other form of hand actuated bolts (winged head bolts, etc.). The diameter and thread pitch of the bolts 24 is not critical, so long as the bolts 24 mate with the holes 22.

Figure 2A:
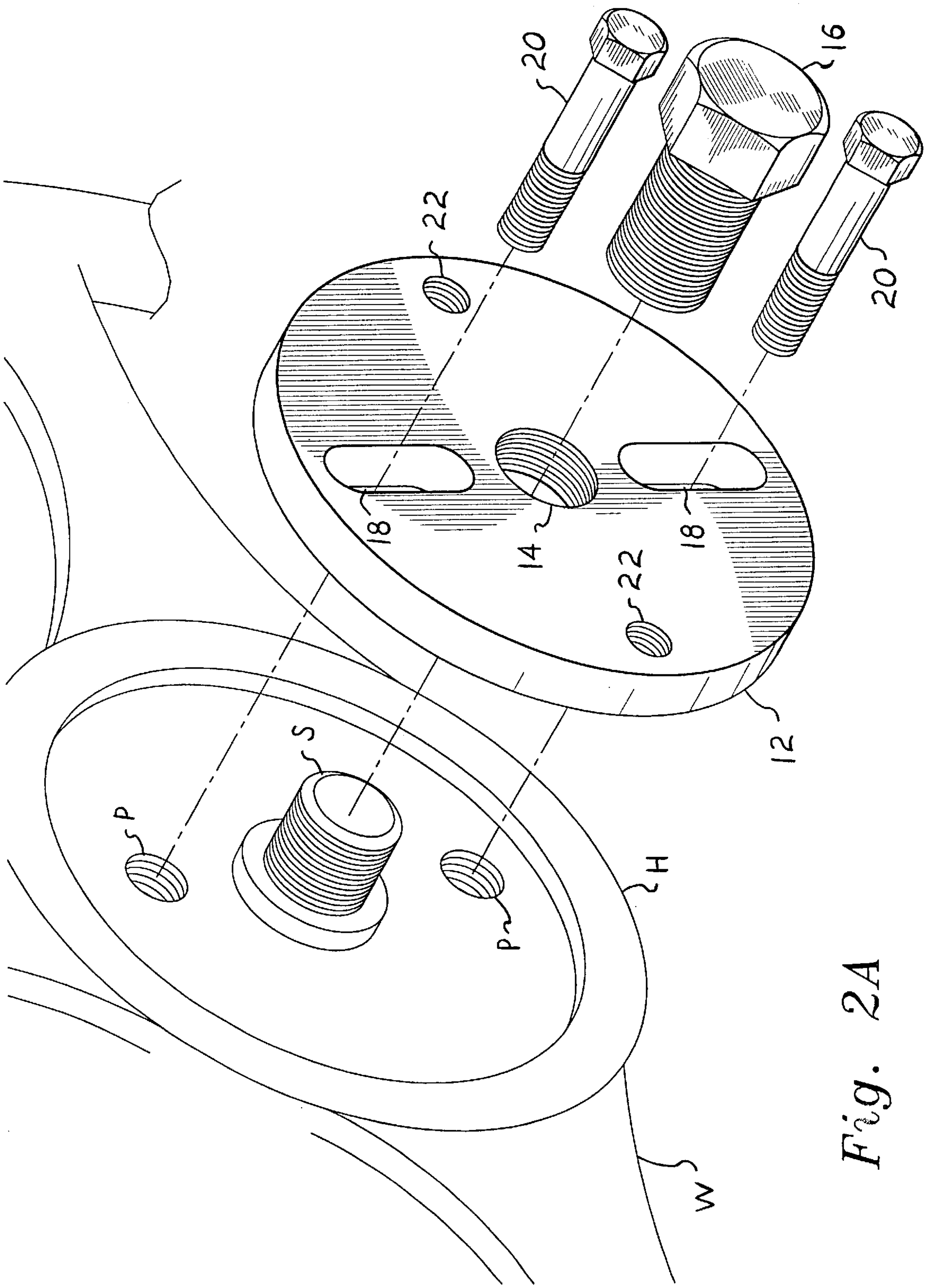
FIG. 2A is an exploded perspective view showing the present tool being positioned for installation on a steering wheel hub, for removal of the hub from the steering wheel shaft.
Figure 2B:
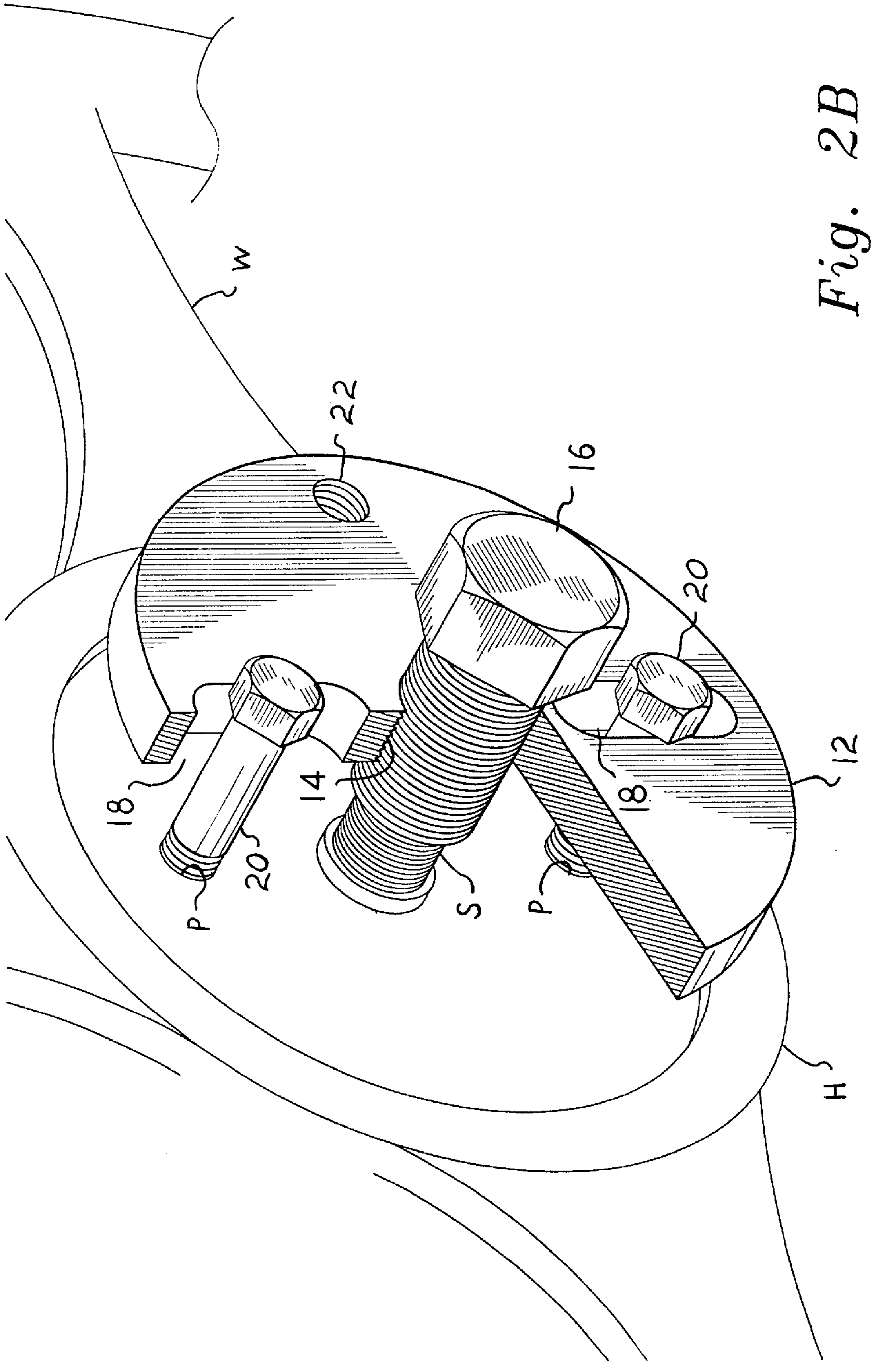
FIG. 2B is a partially broken away perspective view of the assembly of FIG. 2A installed upon the steering wheel hub.

FIGS. 2A and 2B show how the present tool 10 is used for removing a steering wheel from its press fit on the end of a steering wheel shaft in a vehicle. In FIG. 2A, the ancillary components (e. g., horn actuating assembly, air bag, etc.) have been removed from the face of the steering wheel W, for accessing the steering wheel hub H. The nut which is conventionally used for locking the steering wheel W to the steering wheel shaft S is not shown in FIG. 2A, as it would have been removed previously for installing the present tool 10.

For removing the steering wheel W from the steering shaft S, the plate 12 is placed over the steering wheel hub H and the two tension bolts 20 are passed through their respective slots 18. (One or more conventional washers, not shown, may be placed beneath the heads of the bolts 20 to provide sufficient bearing area, if the heads of the bolts 20 are not significantly larger than the widths of the slots 18.) The tension bolts 20 are threaded into the corresponding hub pulling holes P, which are conventionally provided in the steering wheel hub for this purpose. The central compression bolt 16 is then threaded into the center hole 14 of the plate 12 to bear against the end of the steering shaft S.

FIG. 2B shows the present tool 10 in its installed position for removing the steering wheel W from the shaft S, with the two tension bolts 20 threaded into the corresponding pulling holes P in the hub H and the compression bolt 16 threaded through the central passage 14 of the plate 12 to bear against the end of the steering shaft S. At this point, a wrench is used to tighten the central compression bolt 16 further downwardly through the threaded central passage 14 of the plate 12. As travel of the bolt 16 is blocked by the end of the steering shaft S, the plate 12 travels up the threads of the bolt 16 to move the plate 12 away from the shaft S. The steering wheel hub H is captured relative to the plate 12 by the tension bolts 20, and thus is pulled from the steering wheel shaft S as the bolt 16 is tightened, thereby loosening the steering wheel hub H from its press fit on the shaft S for removal.

Figure 3A:
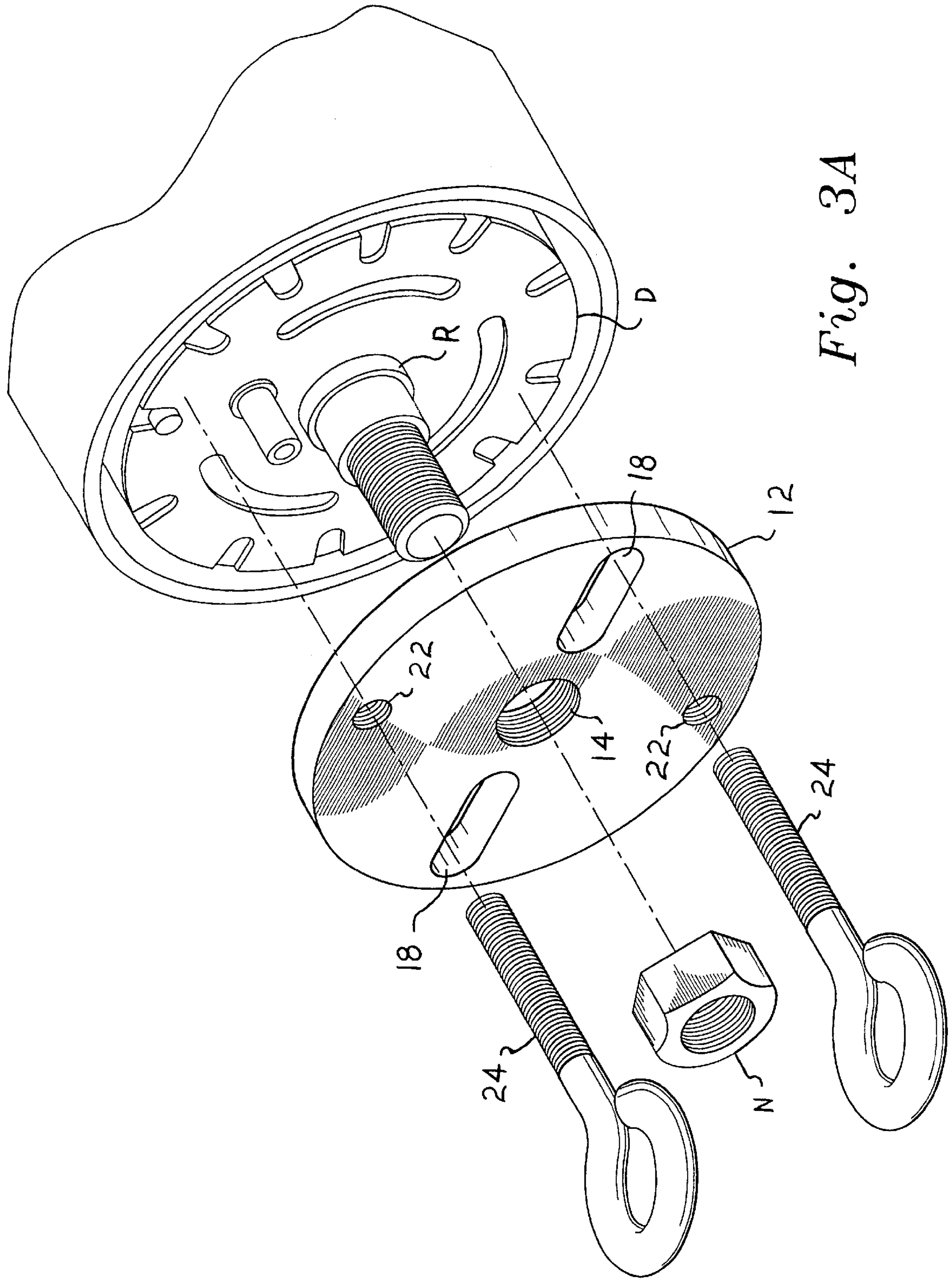
FIG. 3A is an exploded perspective view showing the present tool being positioned for installation for compressing a locking disc in a steering wheel column.
Figure 3B:
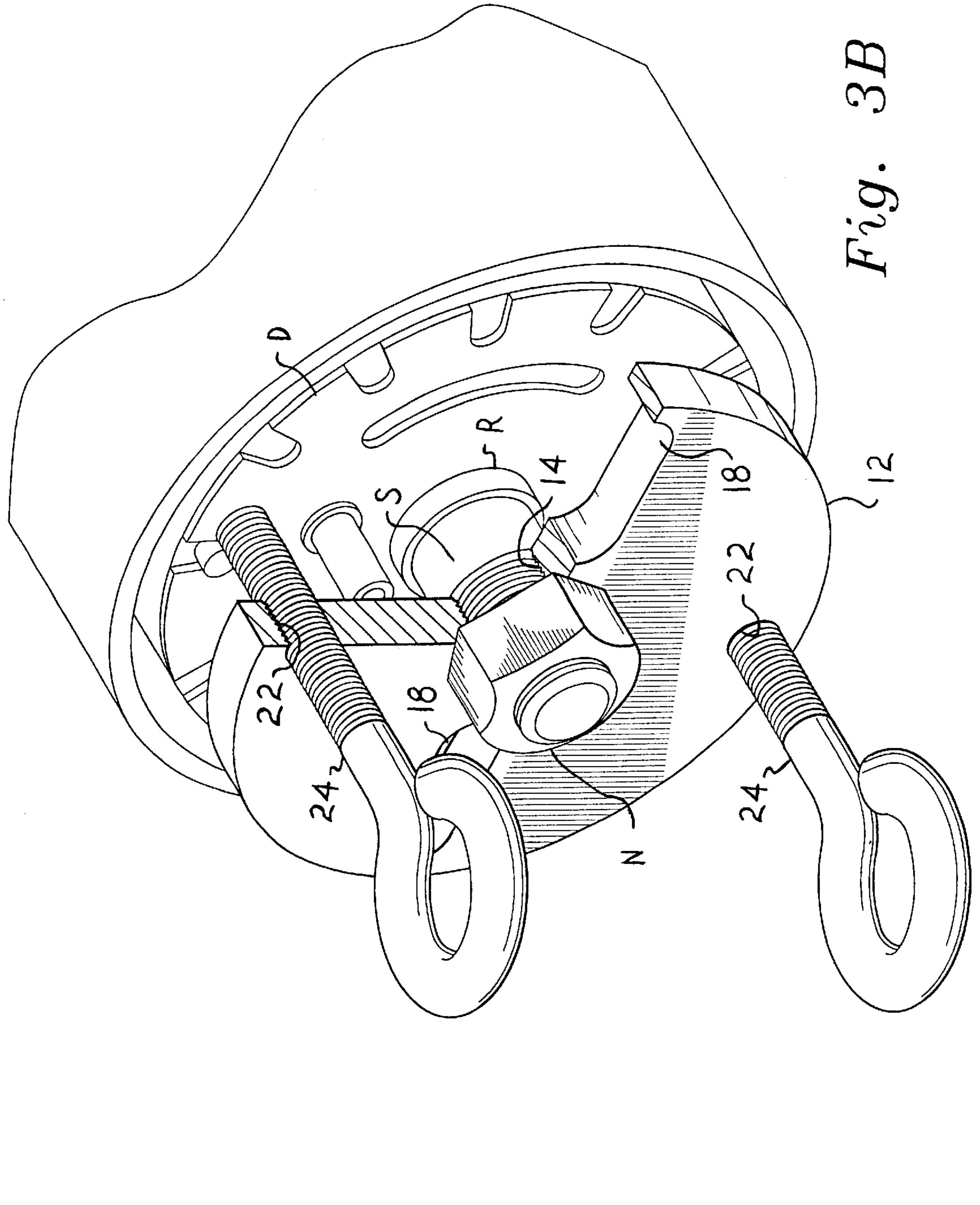
FIG. 3B is a partially broken away perspective view of the assembly of FIG. 3A installed upon the steering wheel shaft.

Once the steering wheel has been removed from its installation on the steering shaft S, the locking disc mechanism may be accessed as shown in FIGS. 3A and 3B. Locking discs D are conventionally held in place on the steering shaft S by a compression spring (not shown) disposed behind the disc D, with a retaining ring (typically a snap ring R) being used above the disc D to retain the disc D on the shaft S. In order to remove the disc D from the shaft S, the compressive pressure of the disc D on the snap ring R must be relieved by compressing the disc D downwardly against its spring, thus relieving the pressure on the snap ring R for ease of removal.

The two tension bolts 16 have been unthreaded from the pulling holes P of the steering wheel hub H, and removed from the corresponding slots 18 of the plate 12. The central compression bolt 16 has also been removed from the central hole or passage 14 of the plate 12, with the resulting disc configuration being essentially as shown in FIG. 3A. The plate 12 is then placed over the threaded end of the steering shaft S (again, the diameter of the central hole 14 in the plate 12 is sufficiently large to provide non-engaging clearance of the threaded and unthreaded portions of the steering shaft S) and the original steering wheel retaining nut N is threaded back onto the end of the steering shaft S to hold the plate 12 in place. The compression bolts 24 are then threaded through the corresponding compression bolt holes 22 of the plate 12, and turned down to bear against the locking disc D, essentially as shown in FIG. 3B. As the plate 12 is captured on the steering shaft S by the overlying retaining nut N, the locking disc D is forced downwardly or inwardly along the steering column, to compress the spring therebehind and free the retaining snap ring R. With pressure removed from the snap ring R, it may be removed conventionally. The compression bolts 24 are then loosened and removed, allowing the locking disc D to ride up the steering shaft S. The retaining nut N is also removed, allowing both the plate 12 and locking disc D to be removed from the steering shaft S for access to components below the disc D.

Installation of the locking disc D is essentially in the reverse order of the procedure described for removing the disc D. The locking disc D is placed over the steering shaft S, and the plate 12 is placed over the disc D. The steering wheel retaining nut N is then secured to the threaded end of the steering shaft S, capturing the plate 12 therebelow. The two disc compression bolts 24 are then threaded into their respective holes 22 in the plate 12, to force the locking disc downwardly against its spring. The retaining means R may then be reinstalled to retain the disc D on the shaft S, with the nut N being removed to remove the plate 12.

In summary, the present combination steering wheel puller and locking disc removal and installation tool will serve to provide a significant advantage for mechanics who need to access components (ignition switch, etc.) within the steering column of a motor vehicle. The versatility of the present combination tool simplifies the number of tools the mechanic would otherwise require for pulling the steering wheel and then removing the locking disc from the steering column, and then reversing the procedure for reassembly.

It will be noted that each of the threaded fasteners used with the present tool are conventional, and may comprise SAE (Society of Automotive Engineers) standard thread configurations, metric thread configurations, or other configurations as desired. The only thread pitch and diameter which is critical to the operation of the present combination tool is for the hub pulling bolts, which must have a configuration to mate with the corresponding hub pulling holes in the steering wheel hub. These holes are generally a standard SAE or metric size, and accordingly such bolts are readily available.

As the fasteners used with the plate of the present combination tool are conventional, most mechanics will have ready access to the required sizes. Accordingly, the plate comprising the heart of the present tool may be provided without fasteners, or perhaps with only the single central compression bolt, for persons who already have a supply of suitable fasteners for use with the plate.

The plate itself is easily manufactured, preferably from steel plate of suitable thickness, with the machining or manufacturing operations being relatively simple for forming and threading the central hole and two outlying disc compression holes, and forming the two hub pulling slots. The result is a tool which is relatively inexpensive to manufacture and thus to purchase, either with or without the threaded fasteners used in its operation. Thus, the present combination tool will pay for itself in short order for a mechanic who has occasion to perform work on the steering column of a motor vehicle, and/or any of the components housed therein.

It is to be understood that the present invention is not limited to the sole embodiment described above, but encompasses any and all embodiments within the scope of the following claims.

I claim:

1. In a vehicle having a steering wheel removably secured to the threaded end of a steering wheel shaft by a retaining nut and having a steering wheel hub including a plurality of threaded wheel pulling passages therein and a steering wheel locking disc compressively disposed beneath the steering wheel hub and secured by compressively bearing against a retaining device disposed about the steering wheel shaft, a combination steering wheel puller and locking disc removal and installation tool, comprising:

a flat, rigid metal plate;

said plate including a threaded central passage therethrough, with said central passage having an internal diameter larger than the threaded end of the steering wheel shaft, for non-engaging clearance therebetween;

said plate further including a plurality of radially disposed steering wheel hub tension bolt slots formed therethrough;

said plate further including a plurality of threaded, radially disposed locking disc compression bolt holes formed therethrough;

a threaded central bolt for mating with and threadedly installing through said threaded central passage of said plate, for bearing against the end of the steering wheel shaft;

a plurality of tension bolts corresponding to said plurality of slots, for removably installing through said slots for engaging the threaded passages of the steering wheel hub, for pulling the steering wheel hub from the shaft as said central bolt is tightened against the end of the steering wheel shaft; and a plurality of locking disc compression bolts corresponding to said plurality of locking disc compression bolt holes, for mating with and threadedly installing through said locking disc compression bolt holes, for compressing the locking disc for removing the retaining device therefrom when said plate is secured to the steering wheel shaft by the retaining nut.

* * * * *